US012608994B2

(12) United States Patent
Bhagat

(10) Patent No.: US 12,608,994 B2
(45) Date of Patent: Apr. 21, 2026

(54) BANKNOTE PROCESSING DEVICE AND METHOD FOR MONITORING A FILLING STATE OF A BANKNOTE PROCESSING DEVICE

(71) Applicant: GIESECKE+DEVRIENT CURRENCY TECHNOLOGY GMBH, Munich (DE)

(72) Inventor: Simranjeet Bhagat, Pathankot (IN)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 15 days.

(21) Appl. No.: 18/847,817

(22) PCT Filed: Mar. 7, 2023

(86) PCT No.: PCT/EP2023/025106
§ 371 (c)(1),
(2) Date: Sep. 17, 2024

(87) PCT Pub. No.: WO2023/179907
PCT Pub. Date: Sep. 28, 2023

(65) Prior Publication Data
US 2025/0201048 A1 Jun. 19, 2025

(30) Foreign Application Priority Data
Mar. 25, 2022 (IN) ............................ 202211016852

(51) Int. Cl.
*G07D 11/23* (2019.01)
*G07D 11/34* (2019.01)

(52) U.S. Cl.
CPC ............ *G07D 11/23* (2019.01); *G07D 11/34* (2019.01)

(58) Field of Classification Search
None
See application file for complete search history.

(56) References Cited

U.S. PATENT DOCUMENTS 9,761,078 B1 9/2017 Schuck
2002/0079361 A1* 6/2002 Kosugi ................. G07D 11/12 235/379
(Continued)

FOREIGN PATENT DOCUMENTS

CN 110910563 A 3/2020

OTHER PUBLICATIONS

International Search Report from corresponding PCT Application No. PCT/EP2023/025106, May 22, 2023.

*Primary Examiner* — Thien M Le
*Assistant Examiner* — April A Taylor
(74) *Attorney, Agent, or Firm* — Workman Nydegger

(57) ABSTRACT

A banknote processing device, includes a banknote compartment configured to receive a plurality of banknotes to be processed and a drive unit configured to move the banknotes out of the banknote compartment such that a filling state of the banknote compartment changes over time. The banknote processing device has an acquisition unit configured to acquire a present filling state of the banknote compartment, the present filling state being representative for an amount of banknotes located within the banknote compartment, wherein the acquisition unit is configured to generate an output signal based on the present filling state of the banknote compartment. A method is provided for monitoring a filling state of a banknote processing device.

15 Claims, 2 Drawing Sheets

(56) References Cited

U.S. PATENT DOCUMENTS

| | | | |
|---|---|---|---|
| 2019/0012869 | A1 | 1/2019 | Berendes |
| 2021/0049853 | A1 | 2/2021 | Baranowski et al. |
| 2022/0068074 | A1 | 3/2022 | Miller |

* cited by examiner

BANKNOTE PROCESSING DEVICE AND METHOD FOR MONITORING A FILLING STATE OF A BANKNOTE PROCESSING DEVICE

BACKGROUND

The disclosure generally relates to banknote processing systems. In particular, the invention relates to a banknote processing device, a singler comprising a banknote processing device and a method for monitoring a filling state of a banknote processing device.

Banknote processing systems are employed in a variety of applications. For example, banknote processing systems may be present in the form of banknote stacking systems, banknote sorting systems or banknote singling systems. During operation, these systems can change an arrangement or order of banknotes to enable the processing of said banknotes. The purpose of such banknote processing systems is to make the handling of banknotes more efficient and ergonomic, in particular for a human operator of the respective system. A human operator usually has a limited insight into the operating characteristics of a banknote processing system such that the operator must rely on a correct and efficient functioning of the system. In order to enable a proper operation of the system, the human operator often has to manually supervise the system and refill banknotes into the system such that idle times of the system are avoided.

SUMMARY

It may be seen as an object of the invention to improve the operation of a banknote processing device.

A device and a method according to the features of the independent claims are provided. Further embodiments are evident from the dependent claims and from the following description.

According to an aspect, a banknote processing device is provided. The banknote processing device comprises a banknote compartment configured to receive a plurality of banknotes to be processed and a drive unit configured to move the banknotes out of the banknote compartment such that a filling state of the banknote compartment changes over time. The banknote processing device further comprises an acquisition unit configured to acquire a present filling state of the banknote compartment, the present filling state being representative for an amount or number of banknotes located within the banknote compartment. The acquisition unit is configured to generate an output signal based on the present filling state of the banknote compartment.

Such a banknote processing device may ensure that a sufficient amount or number of banknotes is always present in the banknote processing device such that any idle times of the banknote processing device can be avoided. In this manner, the overall operation efficiency of the banknote processing device can be improved. Furthermore, if a human operator supervises the banknote processing device, the operator can be informed of the fact that there is an insufficient amount or number of banknotes currently present in the banknote processing device such that the operator can refill banknotes into the device. For example, if the operator is working in a location at the banknote processing device where the banknote processing device is refilled by the operator, the relevant area where the operator could see that the banknote processing device gets empty, i.e., has an insufficient amount or number of banknotes, might not be visible to the operator. That is, if the banknote processing device gets empty, the operator might not know if this is due to error of the device or something else that caused the device to stop its operation.

The inventive banknote processing device may provide the operator with an indication prior to the device getting emptied, such that idle times of the banknote processing device or the overall system can be avoided. The banknote processing device can then directly inform the user of such a condition and/or automatically initiate a counter measure that prevents the banknote processing device from getting completely emptied. Refilling the banknote processing device with additional banknotes can thus be achieved before the device stops and the device can continue processing.

The banknote compartment may house or enclose the plurality of banknotes within the banknote processing device during operation. The banknote compartment may be in the form of a box, a container or the like, which is configured to substantially retain the banknotes within the banknote compartment during operation of the banknote processing device. The banknote compartment may comprise a filling access through which banknotes can be filled into the banknote compartment as well as an outlet through which the banknotes are moved out of the banknote compartment.

The banknotes may be present in a stacked manner within the banknote compartment and may be sequentially or successively moved out of the banknote compartment, by the drive unit, for further processing. In particular, the banknotes may be moved out of the banknote compartment one after the other such that only one single banknote is moved out of the banknote compartment at a certain point in time before a next single banknote is moved out of the banknote compartment at a subsequent point in time. The result is that the amount or number of banknotes present within the banknote compartment may decrease over time, i.e., the filling state of the banknote compartment decreases over time.

The acquisition unit may acquire and/or determine the present filling state of the banknote compartment by constantly or periodically monitoring the present/respective filling state over time. The output signal generated by the acquisition unit may indicate the acquired present filling state to a human operator such that the human operator knows when refilling of the banknote compartment with additional banknotes is required. Additionally or alternatively, the output signal can be used by a controller which may then automatically initiate a refilling of the banknote compartment when the output signal indicates that a refilling of the banknote compartment with additional banknotes is required. This may ensure that there is always a sufficient amount or number of banknotes present in the banknote compartment. The output signal may be generated periodically, i.e., at predetermined points in time, or only when the acquisition unit determines that the filling state approaches a critical or minimum level of banknotes remaining in the banknote compartment.

According to an embodiment, the acquisition unit is configured to acquire the present filling state based on sensor data obtained from within the banknote compartment.

This means that the acquisition unit may directly obtain information about the current filling state from the inside of the compartment. The acquisition unit may thus comprise a camera, a proximity sensor, an audio sensor, a radar sensor or the like, all of which are configured to measure the present filling state within the banknote compartment. In this case, the acquisition unit may be arranged at or inside of the banknote compartment or in the vicinity thereof. In particular, the acquisition unit may have a direct line of sight onto the banknotes located within the banknote compartment.

According to an embodiment, the sensor data obtained from within the banknote compartment comprises at least one of optical sensor data, proximity sensor data, radar sensor data and acoustic sensor data.

This data can be obtained by the acquisition unit, wherein the acquisition unit or a processor thereof is configured to generate the output signal based on one or more of this data. For example, the acquisition unit may comprise a camera which obtains the optical data, a proximity sensor which obtains the proximity data, a radar sensor which obtains the radar data or an acoustic sensor which contains the acoustic data.

According to an embodiment, the acquisition unit is configured to acquire the present filling state based on an operational parameter of the drive unit.

The drive unit may trigger the movement of the banknotes out of the banknote compartment. Therefore, the drive unit may apply a force onto one of the banknotes to move said banknote out of the banknote compartment. Different amounts of forces may be required to initiate the movement of the banknote which in turn requires a change of the operational parameters of the drive unit when the banknotes are subsequently moved out of the banknote compartment. In particular, a reducing amount or number of banknotes within the banknote compartment may require less force that is to be applied by the drive unit onto the banknote in order to move the banknote out of the banknote compartment. The operational parameter may include at least one of a torque generated by the drive unit, a force generated by the drive unit and an electrical energy consumption of the drive unit.

According to an embodiment, the acquisition unit is configured to acquire the present filling state based on a relative torque generated by the drive unit, which present torque is required to move a banknote out of the banknote compartment.

The drive unit may comprise a motor which is configured to generate the torque. The torque may be transmitted to the banknote which is to be moved out of the banknote compartment. The drive unit may therefore comprise a transmission for transmitting the generated torque onto a drive element which transforms the generated torque into a force that moves the banknote out of the banknote compartment. In case the banknotes are present within the banknote compartment in a stacked arrangement and the lowermost banknote is to be moved out of the banknote compartment, the required torque that must be generated by the drive unit may decrease over time since less banknotes in the stack produce less weight, thus reducing the amount of torque that must be provided by the drive unit to move the lowermost banknote out of the banknote compartment.

According to an embodiment, the present torque generated by the drive unit corresponds to a present current in units of amperes supplied to the drive unit, wherein the acquisition unit is configured to acquire the present filling state based on the current or the electrical energy supplied to the drive unit during continuous operation.

For example, the required torque may be proportional to the required current that has to be supplied to the drive unit since a higher torque requires more electrical energy. The electrical energy, in particular the current, supplied to the drive unit may be used to determine the present filling state of the banknote compartment. The relationship of torque and electrical current in units of Amperes supplied to the motor can be converted into duty cycle of the motor. This duty cycle of drive motor can be used as an input by the acquisition unit to detect changes over time with respect to number of banknotes in the compartment.

According to an embodiment, the acquisition unit is configured to acquire a present movement velocity with which said banknote, in particular the lowermost banknote, is moved out of the banknote compartment, wherein the acquisition unit is configured to acquire the present filling state further based on the present movement velocity with which said banknote is moved out of the banknote compartment.

The acquisition unit, for example a processor of the acquisition unit, may apply an algorithm that uses the acquired present torque and the acquired present movement velocity to determine the present filling state of the banknote compartment.

According to an embodiment, the banknote compartment is configured to receive the plurality banknotes in a stacked manner, such that the banknotes are stacked one upon the other within the banknote compartment, wherein the drive unit is configured to move a lowermost banknote out of the banknote compartment for further processing while the remaining banknotes are kept within the banknote compartment.

This means that only one single banknote may be moved out of the banknote compartment at a certain point in time. All banknotes remaining within the banknote compartment may then be subsequently moved out of the banknote compartment in the same manner, i.e., as one single lowermost banknote. The banknote stack therefore gets lower since the banknotes are subsequently removed from the banknote compartment over time. As the banknote stack gets lower, the mass and weight that corresponds to the stack and acts on the lowermost banknote also reduces. The required force or torque that the drive unit must deliver to move the lowermost banknote out of the banknote compartment accordingly also reduces over time. The required torque can thus provide an indication for the current filling state of the banknote compartment.

According to an embodiment, the output signal comprises information about the present filling state of the banknote compartment.

The information may include an indication of an amount or number of remaining banknotes in the banknote compartment. The information may also include an indication of a remaining time until the banknote compartment is completely emptied. The information may include other visual and/or audible indications based on which an operator is able to determine whether the banknote compartment has to be refilled to avoid any idle times of the banknote processing device.

According to an embodiment, the output signal is generated by the acquisition unit when the present filling state deviates from a desired filling state by more than a predetermined threshold amount.

This means that the output signal might not be continuously generated during the operation of the banknote processing device, but rather at a point in time when the acquisition unit has determined that the amount or number of banknotes remaining in the banknote compartment decreases below a critical or minimum value. The threshold amount may correspond to a threshold number of banknotes or a threshold torque of the drive unit or a threshold voltage supplied to the drive unit or the threshold duty cycle of motor. In order to ensure continuous operation of the banknote processing device, the threshold amount may be chosen such that there is sufficient time for the operator or a controller to refill the banknote compartment with additional banknotes before the banknote compartment gets completely emptied.

According to an embodiment, the banknote processing device comprises a user interface, wherein the acquisition unit is configured to provide the output signal via the user interface to a user of the banknote processing device.

The user interface may comprise a visual interface, for example a display, or an audio interface, for example a loudspeaker or an audible buzzer.

According to an embodiment, the banknote processing device comprises a control unit, wherein the acquisition unit is configured to provide the output signal to the control unit, and wherein the control unit is configured to control the banknote processing device based on the output signal.

The control unit may comprise a processor to process the output signal from the acquisition unit such that a control signal can be provided based on which the banknote processing device can be controlled. The control signal may change an operational state of the banknote processing device or of parts thereof. For example, the control signal may stop operation or change an operational speed of the banknote processing device. It is possible that the control signal initiates a filling operation of the banknote compartment, wherein additional banknotes are supplied to the banknote compartment.

According to an embodiment, the control unit is configured to control the banknote processing device by filling the banknote compartment with additional banknotes. Additionally or alternatively, the control unit is configured to control the banknote processing device by setting an operational parameter of the drive unit.

In this manner, the control unit can automatically ensure that the banknote compartment is not emptied and that idle times of the entire banknote processing device can be avoided. This can be achieved by refilling banknotes into the banknote compartment in due time if the acquisition unit has indicated via the output signal to the control unit that the current filling state is insufficient, i.e., the amount of banknotes in the banknote compartment has decreased below the threshold amount of banknotes.

According to an aspect, a banknote singler comprising the banknote processing device as described herein is provided.

The singler may be configured to single the banknotes during operation of the banknote processing device. A singling of banknotes may include a movement of the banknotes out of the banknote compartment such that all banknotes removed from the banknote compartment may appear spatially separated from each other. This may allow a further processing of the banknotes, for example subsequent to removing the banknotes from the banknote compartment.

According to an aspect, a method for monitoring a filling state of a banknote processing device is provided. In a step of the method, a plurality of banknotes is received within a banknote compartment of the banknote processing device. In another step, the banknotes are successively or subsequently moved out of the banknote compartment such that a filling state of the banknote compartment changes over time. In another step, a current filling state of the banknote compartment is acquired, wherein the current filling state is representative for an amount or number of banknotes located within the banknote compartment. In another step, an output signal is generated based on the current filling state of the banknote compartment.

The steps of the inventive method may be sequentially executed in the indicated order. However, it is possible that the steps may be executed in any other order.

BRIEF DESCRIPTION OF THE DRAWINGS

The present invention will hereinafter be described in conjunction with the following drawing figures, wherein like numerals denote like elements, and wherein.

DETAILED DESCRIPTION OF VARIOUS EMBODIMENTS

Figure 1:
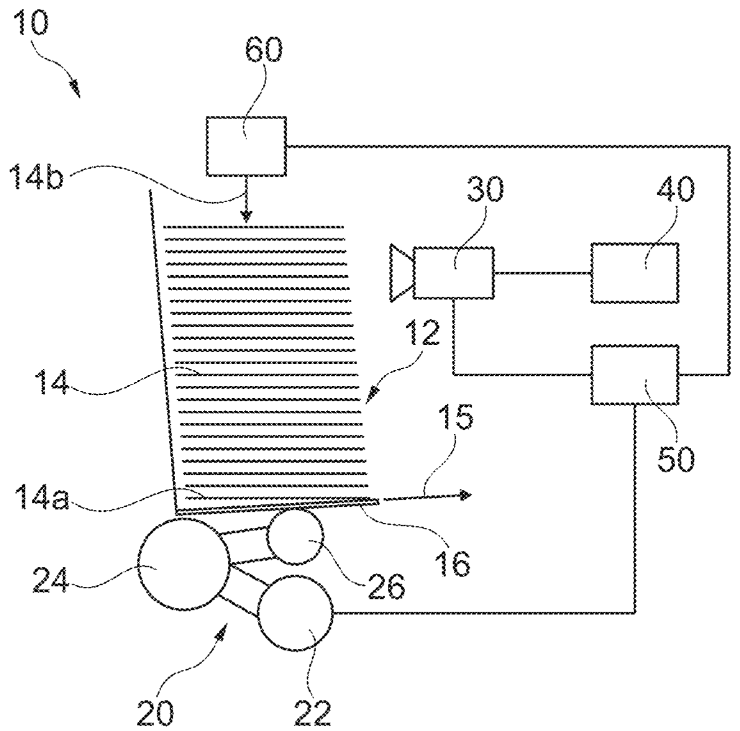
FIG. 1 shows a schematic of a banknote processing device according to an exemplary embodiment.

The representations and illustrations in the drawings may be schematic and not to scale. A better understanding of the method and device described above may be obtained through a review of the shown illustrations together with a review of the detailed description that follows.

FIG. 1 shows a schematic of a banknote processing device 10. The banknote processing device 10 comprises a banknote compartment 12 configured to receive a plurality of banknotes 14 which are arranged within the banknote compartment 12. In particular, the banknote compartment 12 houses or encloses the plurality banknotes 14 in a stacked manner, such that the banknotes 14 are stacked one upon the other within the banknote compartment 12. The banknote processing device 10 further comprises a drive unit 20 which, at a certain point in time, may only move the lowermost banknote **14*a* out of the banknote compartment 12 for further processing while the remaining banknotes 14 of the stack are kept within the banknote compartment 12. Afterwards, the next lowermost banknote 14*a* is moved out of the banknote compartment 12 in the same way. The movement direction 15 of the lowermost banknote 14*a* when moved out of the banknote compartment 12 is indicated by an arrow in FIG. 1**.

The drive unit 20 may comprise a motor 22 which is configured to generate a torque. The torque generated by the motor 22 may be transmitted via a transmission 24, e.g., drum 24, to a drive element 26, e.g., hopper 26, wherein the drive element 26 finally applies a force onto the lowermost banknote **14*a* which causes the movement of the lowermost banknote 14*a* out of the banknote compartment 12. The drive element 26 may include a pusher 16 or catch 16 which contacts or engages the lowermost banknote 14*a* to initiate movement of said lowermost banknote 14*a*. The drive element 26** may therefore include roller with a rubber-like material which at least sectionally covers the roller.

The banknote processing device 10 further comprises an acquisition unit 30 for acquiring a present filling state of the banknote compartment 12, wherein the present filling state is representative for an amount or number of banknotes 14 currently located within the banknote compartment 12. The acquisition unit 30 may be arranged at or inside the banknote compartment 12 such that the acquisition unit 30 can obtain the information about the current filling state directly from within the banknote compartment 12. For example, the acquisition unit 30 comprises at least one of an optical sensor, a proximity sensor, an audio sensor or a radar sensor, wherein these sensors may have a direct view on the banknotes 14 located within the banknote compartment 12 such that a present fullness level, i.e., the present filling state, of the banknote compartment 12 can be detected.

The acquisition unit 30 unit may then generate an output signal based on the present filling state of the banknote compartment 12 and transmit this output signal to a user interface 40 which is an optional part of the banknote processing device 10. The user interface 40 may be configured to present the output signal or information corresponding to the output signal to a user (not shown) of the banknote processing device 10. The user interface 40 may include a display for visually indicating the present filling state or a loudspeaker or buzzer for acoustically indicating the current filling state. In particular, the user interface 40 may provide an information to the user indicating that the present filling state has reached or approaches a critical value. In particular, the output signal is generated by the acquisition unit 30 and output via the user interface 40 when the present filling state deviates from a desired filling state by more than a predetermined threshold amount or when the current filling state has reached a minimum filling state. This ensures that the user can manually fill additional banknotes 14*b* into the banknote compartment 12 before the banknote compartment 12 is completely emptied, thus preventing an idle time of the banknote processing device 10 which would affect operation of an overall banknote processing system into which the banknote processing device 10 is integrated.

In addition to or instead of the banknote processing device 10 comprising the user interface 40, the banknote processing device 10 may comprise a control unit 50 which is configured to receive the output signal from the acquisition unit 30. The control unit 50 is an optional part of the banknote processing device 10. The control unit 50 may control the banknote processing device 10 based on the output signal by filling the banknote compartment 12 with additional banknotes 14*b*. The control unit 50 may therefore activate a supply unit 60, e.g., a transport unit, for automatically supplying the additional banknotes 14*b* into the banknote compartment 12. The control unit 50 may determine based on the output signal that the present filling state has reached or approaches a critical value. In particular, the output signal is generated by the acquisition unit 30 and transmitted to the control unit 50 when the present filling state deviates from a desired filling state by more than a predetermined threshold amount or when the current filling state has reached a minimum filling state. Additionally or alternatively, the control unit 50 is configured to control the banknote processing device 10 by setting an operational parameter of the drive unit 20 based on the output signal received from the acquisition unit 30. The control unit 50 may therefore be communicatively coupled to the motor 22 of the drive unit 20 in order to set the operational parameter, for example a torque, generated by the drive unit 20.

The connecting lines in FIG. 1 may indicate signal transmissions between the different parts of the banknote processing device 10. Each signal transmission may include a wired and/or wireless signal transmission.

Figure 2:
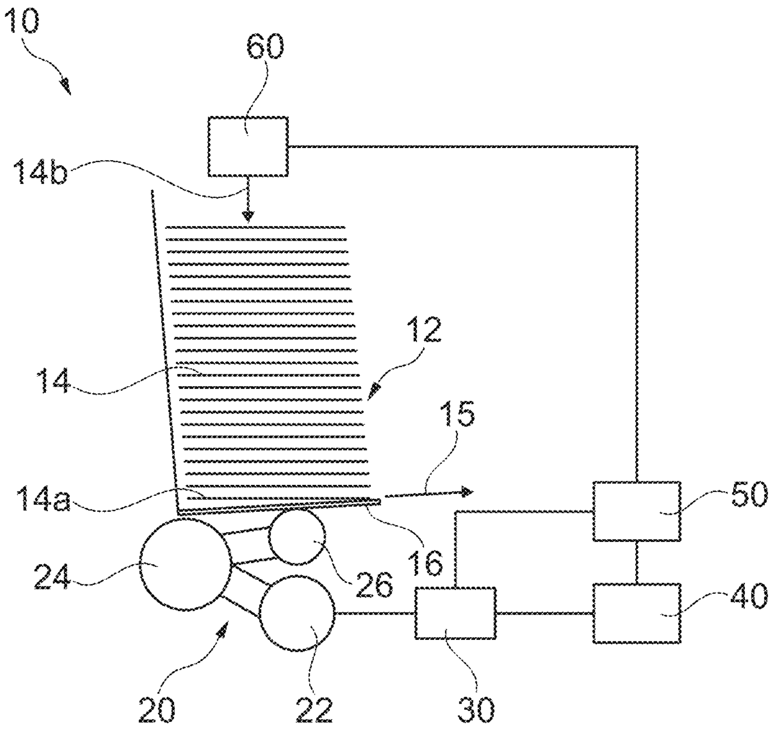
FIG. 2 shows a schematic of a banknote processing device according to another exemplary embodiment.

FIG. 2 shows a schematic of a banknote processing device 10 according to another exemplary embodiment. The basic configuration of the banknote processing device 10 is the same as shown in FIG. 1. However, instead of acquiring the current filling state directly from the banknote compartment 12, the acquisition unit 30 of FIG. 2 acquires the current filling state based on an operational parameter of the drive unit 20, in particular a torque generated by the drive unit 20, and then generates the output signal based on the acquired current filling state.

Again, the banknote processing device 10 comprises a banknote compartment 12 configured to receive a plurality of banknotes 14 which are arranged within the banknote compartment 12. In particular, the banknote compartment 12 houses or encloses the plurality banknotes 14 in a stacked manner, such that the banknotes 14 are stacked one upon the other within the banknote compartment 12. The drive unit 20 may only move the lowermost banknote 14*a* out of the banknote compartment 12 for further processing while the remaining banknotes 14 of the stack are kept within the banknote compartment 12. Afterwards, the next lowermost banknote 14*a* is moved out of the banknote compartment 12 in the same way. The movement direction 15 of the lowermost banknote 14*a* when moved out of the banknote compartment is indicated by an arrow in FIG. 2.

The drive unit 20 may comprise a motor 22 which is configured to generate a torque. The torque generated by the motor 22 may be transmitted via a transmission 24, e.g., drum 24, to a drive element 26, e.g., hopper 26, wherein the drive element 26 finally applies a force onto the lowermost banknote 14*a* which causes the movement of the lowermost banknote 14*a* out of the banknote compartment 12. The drive element 26 may include a pusher 16 or catch 16 which contacts or engages the lowermost banknote 14*a* to initiate movement of said lowermost banknote 14*a*. The drive element 26 may therefore include roller with a rubber-like material which at least sectionally covers the roller.

In the present case, the acquisition unit 30 acquires the present filling state of the banknote compartment 12 by monitoring or measuring the torque generated by the drive unit 20. The acquisition unit 30 may thus be a torque measuring unit or a torque sensor which is adapted to obtain the currently generated torque from the drive unit 20, in particular from the motor 22 of the drive unit 20. Since the banknotes 14 are present within the banknote compartment 12 in a stacked arrangement and only the lowermost banknote 14*a* is moved out of the banknote compartment 12 repeatedly over time, the required torque that must be generated by the drive unit 20 decreases over time since less banknotes 14 in the stack produce less weight. This reduces the amount of torque that must be provided by the drive unit 20 to move the respective lowermost banknote 14*a* out of the banknote compartment 12.

Instead of acquiring the present filling state directly from a condition monitored within the banknote compartment 12 as described in FIG. 1, the example of FIG. 2 uses the operational parameters of the drive unit 20, e.g., the motor 22, to detect any replenishment requirements of the banknote compartment 12. The torque produced by the motor 22 will vary depending on the height of the stack of banknotes 14 and thus the weight of all banknotes 14 remaining on top of the drive unit 20 at a specified time. The determination of the current filling state may include the consideration that a required current for the motor 22 will increase based on the resistance, wherein the required torque increases with the height and weight of the stack of banknotes 14 remaining within the banknote compartment 12. A smart algorithm can be used to detect the torque with respect to a transport speed of the motor 22. This transport speed which corresponds to a movement velocity of the lowermost banknote 14*a* when being moved out of the banknote compartment 12 can also be acquired by the acquisition unit 30. By indirect means the electrical energy supply to the motor 22 to produce a certain torque will be smartly monitored to detect the amount or number of banknotes 14 in approximation over the drive unit 20 at a certain point in time.

The user interface 40, which is an optional part of the banknote processing device 10, can then indicate to the user (not shown) that the time for refilling the banknote compartment 12 with additional banknotes 14*b* has arrived. In particular, the user interface 40 can present the existing filling state to the user in the same manner as explained above with respect to FIG. 1.

In addition to or instead of the banknote processing device 10 comprising the user interface 40, the banknote processing device 10 of FIG. 2 may comprise a control unit 50 which is configured to receive the output signal from the acquisition unit 30. The control unit 50 is also an optional part of the banknote processing device 10. The control unit 50 may control the banknote processing device 10 based on the output signal by filling the banknote compartment 12 with additional banknotes 14*b*. The control unit 50 may therefore activate a supply unit 60, e.g., a transport unit, for automatically supplying the additional banknotes 14*b* into the banknote compartment 12. The control unit 50 may determine based on the output signal that the current filling state has reached or approaches a critical value. In particular, the output signal is generated by the acquisition unit 30 and transmitted to the control unit 50 when the current filling state deviates from a desired filling state by more than a predetermined threshold amount or when the current filling state has reached a minimum filling state. Additionally or alternatively, the control unit 50 is configured to control the banknote processing device 10 by setting an operational parameter of the drive unit 20 based on the output signal received from the acquisition unit 30. The control unit 50 may therefore be communicatively coupled to the motor 22 of the drive unit 20 in order to set an operational parameter, for example a torque, generated by the drive unit 20.

The connecting lines in FIG. 2 may again indicate signal transmissions between the different parts of the banknote processing device 10. Each signal transmission may include a wired and/or wireless signal transmission.

Figure 3:
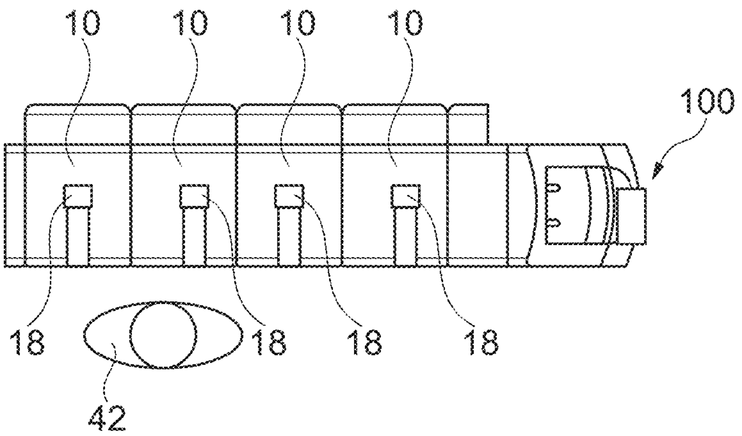
FIG. 3 shows a side view of a singler according to an exemplary embodiment.

FIG. 3 shows a side view of a singler 100 comprising the banknote processing device 10 as described above. In this example, the singler 100 comprises four banknote processing devices 10. However, it is understood that any number of processing devices 10 may be combined for one singler 100. The singler 100 is configured for singling banknotes 14 by sequentially moving the lowermost banknote 14*a* out of a banknote compartment 12 of the respective banknote processing device 10 (cf. FIGS. 1 and 2). Each banknote processing device 10 may comprise a filling access 18 for filling additional banknotes 14*b* into the respective banknote compartments 12. This may be carried out by the operator 42 or automatically by the control unit 50 as described with respect to FIGS. 1 and 2.

Figure 4:
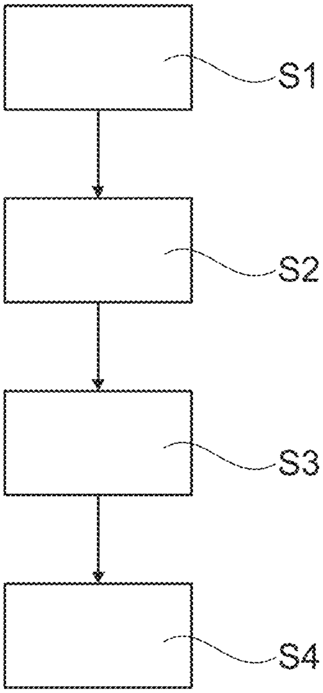
FIG. 4 shows a flow diagram of a method for monitoring a filling state of a banknote processing device according to an exemplary embodiment.

FIG. 4 shows a flow diagram of a method for monitoring a filling state of a banknote processing device 10. With continued reference also to FIGS. 1 and 2 above, the method comprises the step S1 of receiving a plurality of banknotes 14 within a banknote compartment 12 of the banknote processing device 10. The method further comprises the step S2 of successively or sequentially moving the banknotes 14 out of the banknote compartment 12 such that a filling state of the banknote compartment 12 changes over time. The method further comprises the step S3 of acquiring a current filling state of the banknote compartment 12, the current filling state being representative for an amount or number of banknotes 14 located within the banknote compartment 12. The method further comprises the step S4 of generating an output signal based on the present filling state.

The invention claimed is:

1. A banknote processing device, comprising:

a banknote compartment configured to receive a plurality of banknotes to be processed;

a drive unit configured to move single banknotes of the plurality of banknotes out of the banknote compartment such that a filling state of the banknote compartment changes over time;

an acquisition unit configured to acquire a present filling state of the banknote compartment, the present filling state being representative for an amount of banknotes located within the banknote compartment;

wherein the acquisition unit is configured to acquire the present filling state based on sensor data obtained from within the banknote compartment;

wherein the acquisition unit is configured to generate an output signal based on the present filling state of the banknote compartment;

wherein, for refilling the banknote compartment with additional banknotes, the acquisition unit is configured to provide the output signal via a user interface of the banknote processing device to a user of the banknote processing device, or the acquisition unit is configured to provide the output signal to a control unit of the banknote processing device, wherein the control unit is configured to control the banknote processing device based on the output signal by filling the banknote compartment with additional banknotes, wherein the control unit is configured to activate a supply unit for automatically supplying additional banknotes into the banknote compartment.

2. The banknote processing device according to claim 1, wherein the sensor data obtained from within the banknote compartment comprises at least one of optical sensor data, proximity sensor data, radar sensor data and acoustic sensor data.

3. The banknote processing device according to claim 1, wherein the acquisition unit is configured to acquire the present filling state based on an operational parameter of the drive unit.

4. The banknote processing device according to claim 1, wherein the acquisition unit is configured to acquire the present filling state based on a torque generated by the drive unit, which torque is required to move a banknote out of the banknote compartment.

5. The banknote processing device according to claim 4, wherein the torque generated by the drive unit corresponds to a current supplied to the drive unit;

wherein the acquisition unit is configured to acquire the present filling state based on the current supplied to the drive unit.

6. The banknote processing device according to claim 4, wherein the acquisition unit is configured to acquire a present movement velocity with which said banknote is moved out of the banknote compartment;

wherein the acquisition unit is configured to acquire the present filling state further based on the present movement velocity with which said banknote is moved out of the banknote compartment.

7. The banknote processing device according to claim 1, wherein the banknote compartment is configured to receive the plurality of banknotes in a stacked manner, such that the plurality of banknotes are stacked one upon the other within the banknote compartment;

wherein the drive unit is configured to move a lowermost banknote out of the banknote compartment for further processing while the remaining banknotes are kept within the banknote compartment.

8. The banknote processing device according to claim 1, wherein the output signal comprises information about the present filling state of the banknote compartment;

wherein the information includes an indication of an amount or number of remaining banknotes in the banknote compartment and/or an indication of a remaining time until the banknote compartment is completely emptied or the information includes other visual and/or audible indications based on which an operator of the banknote processing device is able to determine whether the banknote compartment has to be refilled to avoid any idle times of the banknote processing device.

9. The banknote processing device according to claim 1, wherein the output signal is generated by the acquisition unit when the present filling state deviates from a desired filling state by more than a predetermined threshold amount.

10. The banknote processing device according to claim 1, wherein the acquisition unit is configured to provide the output signal to the control unit of the banknote processing device;

wherein the control unit is configured to control the banknote processing device based on the output signal;

wherein the control unit is configured to control the banknote processing device by setting an operational parameter of the drive unit.

11. A banknote singler comprising the banknote processing device according to claim 1.

12. The banknote processing device according to claim 1, wherein the acquisition unit is configured to provide an output signal to the control unit of the banknote processing device, wherein the control unit is configured to control the banknote processing device based on the output signal by filling the banknote compartment with additional banknotes, in order to automatically ensure that the banknote compartment is not emptied and idle times of the entire banknote processing device are avoided.

13. The banknote processing device according to claim 12, wherein, for refilling banknotes into the banknote compartment in due time, the acquisition unit is configured to indicate via the output signal to the control unit that the current filling state is insufficient.

14. A method for monitoring a filling state of a banknote processing device, comprising:

receiving a plurality of banknotes within a banknote compartment of the banknote processing device;

successively moving single banknotes of the plurality of banknotes out of the banknote compartment such that a filling state of the banknote compartment changes over time;

acquiring a present filling state of the banknote compartment, the present filling state being representative for an amount of banknotes located within the banknote compartment;

generating an output signal based on the present filling state by an acquisition unit of the banknote processing device, that is configured to acquire the present filling state based on sensor data obtained from within the banknote compartment, wherein, for refilling the banknote compartment with additional banknotes, the acquisition unit provides the output signal via a user interface of the banknote processing device to a user of the banknote processing device or the acquisition unit provides the output signal to a control unit of the banknote processing device, wherein the control unit controls the banknote processing device based on the output signal by filling the banknote compartment with additional banknotes, wherein the control unit activates a supply unit for automatically supplying additional banknotes into the banknote compartment.

15. The method for monitoring a filling state of a banknote processing device according to claim 14, wherein refilling the banknote processing device with additional banknotes is achieved before the banknote processing device stops and the banknote processing device can continue processing.

* * * * *